(12) United States Patent
Nowottnick (10) Patent No.: US 7,420,455 B2
(45) Date of Patent: Sep. 2, 2008

(54) ELECTRONIC COMMUNICATION SYSTEM AND METHOD OF DETECTING A RELAY ATTACK THEREON

(75) Inventor: Jürgen Nowottnick, Hamburg (DE)

(73) Assignee: NXP B.V., Eindhoven (NL)

( * ) Notice: Subject to any disclaimer, the term of this patent is extended or adjusted under 35 U.S.C. 154(b) by 452 days.

(21) Appl. No.: 10/536,817

(22) PCT Filed: Nov. 24, 2003

(86) PCT No.: PCT/IB03/05378

§ 371 (c)(1),
(2), (4) Date: May 27, 2005

(87) PCT Pub. No.: WO2004/051581

PCT Pub. Date: Jun. 17, 2004

(65) Prior Publication Data

US 2006/0044108 A1    Mar. 2, 2006

(30) Foreign Application Priority Data

Nov. 29, 2002  (DE) ................................ 102 55 880

(51) Int. Cl.
   *G05B 19/00* (2006.01)
(52) U.S. Cl. .................................................. 340/5.61
(58) Field of Classification Search ............... 340/5.61, 340/539.1, 572.1, 10.2, 5.63
See application file for complete search history.

(56) References Cited

U.S. PATENT DOCUMENTS 5,760,700 A * 6/1998 Ellis .......................... 340/5.26
6,657,536 B1 * 12/2003 Avenel ....................... 340/5.61
2002/0163419 A1 * 11/2002 Ott ............................ 340/5.61
2006/0164209 A1 * 7/2006 De Zeeuw .................. 340/5.72

* cited by examiner

*Primary Examiner*—Brian Zimmerman
*Assistant Examiner*—Nabil H Syed
(74) *Attorney, Agent, or Firm*—Peter Zawilski (57) ABSTRACT

In the case of an electronic communication system (100) having; a) at least one base station (10) having at least one antenna unit (16: 16a, 16b), in particular in coil form, which base station (10) is arranged in particular on or in an object to be secured against unauthorized use and/or against unauthorized access, such as on or in, say, a means of transport or on or in an access system, and, b) at least one transponder station (40), in particular in data-carrier form, having at least one antenna unit (44: 44a, 44b), in particular in coil form, which transponder station (40), c) may in particular be carried with him by an authorized user and/or, d) is designed to exchange data signals (22, 24) with the base station (10), in which case, by means of the data signals (22, 24), e) the authorization for use and/or access can be determined and/or, f) the base station (10) can be controlled accordingly, and in the case of a method of detecting and/or guarding against at least one, in particular external, attack, and preferably at least one relay attack, on an electronic communication system (100) of this kind, to enable the electronic communication system (100) and the method to be further developed in such a way that the attack is at least made substantially more difficult and if possible is fully guarded against and prevented, it is proposed that, g) there be arranged in the base station (10) at least one first delay element (17) for setting a defined, and in particular substantially constant, signal transit time ($t_1$) within the base station (10) and/or, h) there be arranged in the transponder station (40) at least one second delay element (47) for setting a defined, and in particular substantially constant, signal transit time ($t_2$) within the transponder station (40).

12 Claims, 7 Drawing Sheets

ELECTRONIC COMMUNICATION SYSTEM AND METHOD OF DETECTING A RELAY ATTACK THEREON

The present invention relates in general to the technical field of security and/or access systems, and in particular to that of so-called P[assive] K[eyless]E[ntry] systems, such as are used, for example, in the area of means of transport and in this case above all in the area of access systems for motor vehicles.

Specifically, the present invention relates to an electronic communication system as detailed in the preamble to the main claim, and to a method of detecting and/or guarding against at least one attack, and particularly an external attack and preferably at least one relay attack, on at least one electronic communication system as detailed in the preamble to the main claim.

Figure 1A:
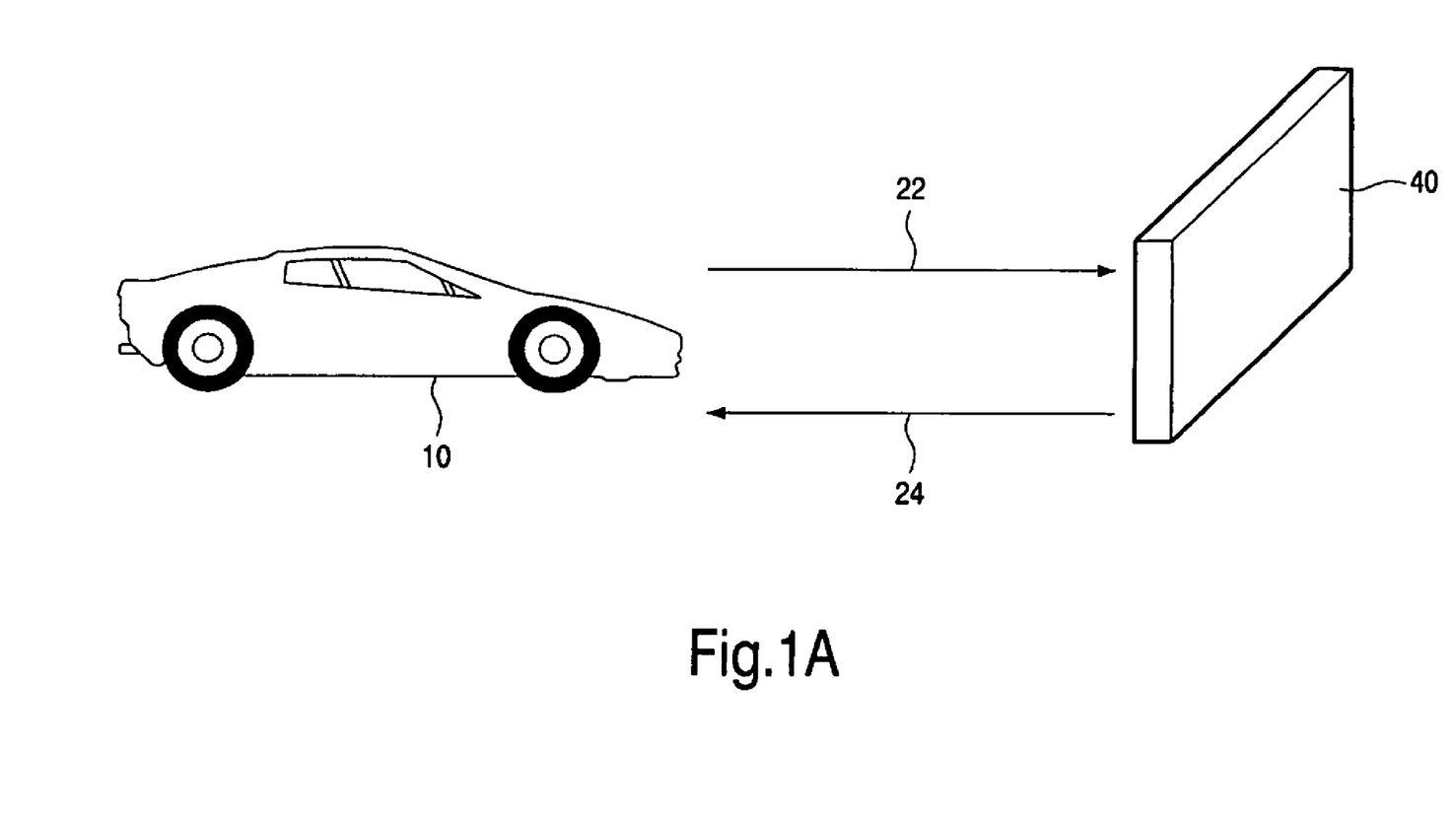
FIG. 1A is a schematic view showing the principle of communication, based on inductive coupling, between a base station and an associated transponder station as in a prior art embodiment.
Figure 1B:
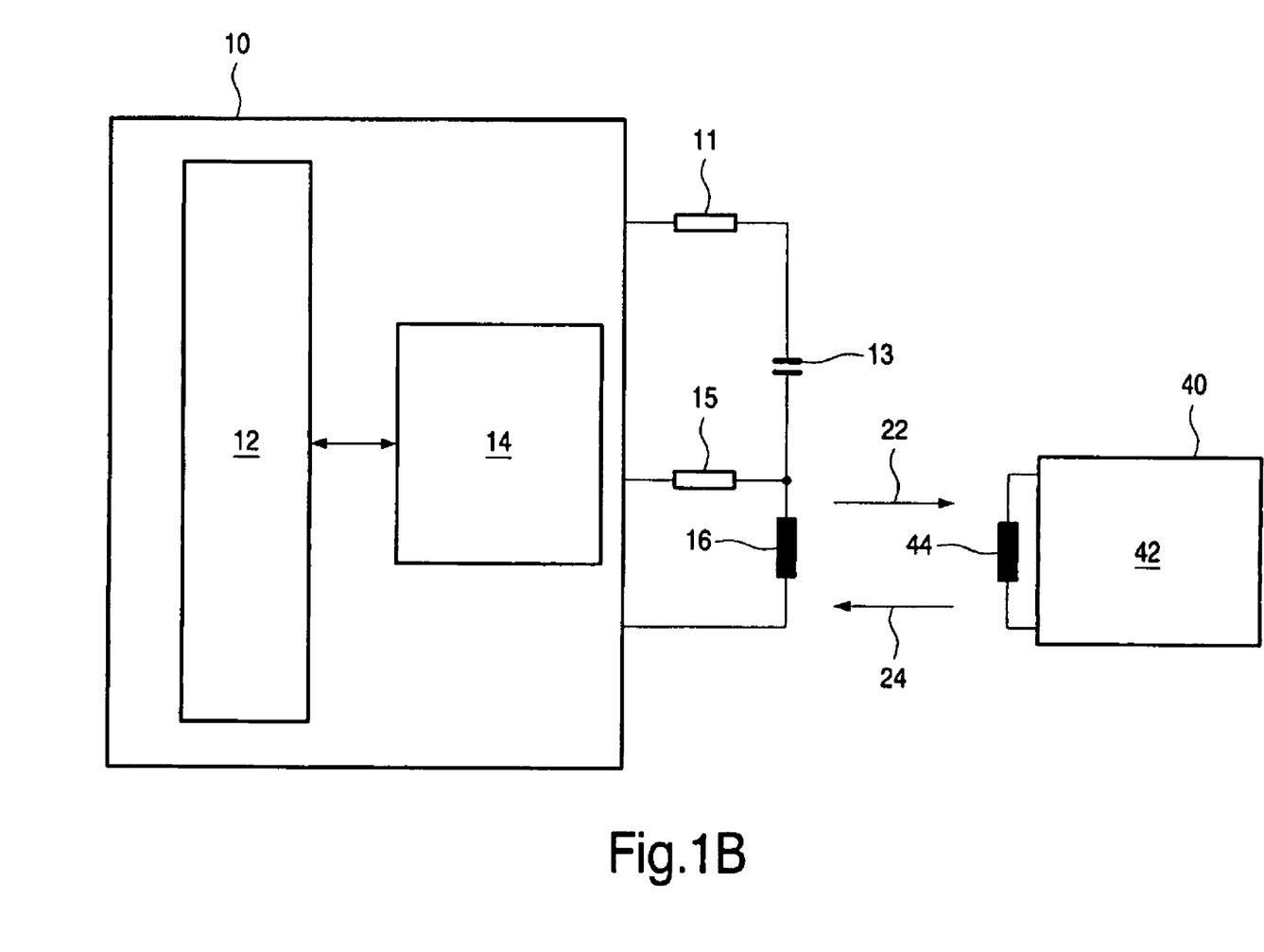
FIG. 1B is the equivalent electrical circuit diagram of the principle of communication shown in FIG. 1A.

To produce electronic communication systems, and particularly P[assive] K[eyless]E[ntry] systems, of the kind specified above that have amongst other things a conventional passive transponder system, use is conventionally made of various configurations. One possible configuration is shown in FIGS. 1A and 1B of the drawings, the example used being that of a P[assive] K[eyless]E[ntry] system for a motor vehicle:

Between a so-called base station 10, that is fitted with an antenna unit 16 in the form of a coil, and a transponder station 40, a communication sequence in the form of a data exchange takes place:

In detail there are, as signal-transmission links between the base station 10 and the transponder station 40, a so-called up-link frame 22 that is formed, for example, by at least one inductively coupled L[ow]F[requency] channel and over which signals are transmitted from the base station 10 to the transponder station 40, and a so-called down-link frame 24 that is formed, for example, by at least one U[ltra]H[igh]F[requency] channel and over which signals are transmitted from the transponder station 40 to the base station 10. As an alternative to this, both the up-link frame 22 and the down-link frame 24 may each be formed by at least one L[ow]F[requency] channel or, as an alternative to this in turn, both the up-link frame 22 and the down-link frame 24 may each be formed by at least one U[ltra]H[igh]F[requency] channel.

After, for example, a door handle of the motor vehicle or a pushbutton on a door of the vehicle has been operated, the base station 10, which is spatially and functionally associated with the motor vehicle, begins to generate a signal that is referred to as a "challenge" and that is transmitted to the transponder station 40 via the up-link frame 22. A circuit arrangement 42 in the transponder station 40, which is preferably equipped with at least one microprocessor, then calculates from the challenge, using a cryptographic algorithm and a secret key, a signal sequence that is referred to as a "response". This response signal is then transmitted from the transponder station 40 to the base station 10 via the down-link frame 24.

The base station 10 then compares the response, using an identical crypto-algorithm and an identical secret key. If identity is found, the base station 10 causes the door lock of the motor vehicle to open, i.e. only if, generally by using cryptographic methods, the authentication process recognizes the transponder station 40 as valid is, in the embodiment given as an example, the door lock of the motor vehicle opened.

If, however, this circuit arrangement is operated in the form shown in FIGS. 1A and 1B without any other added technical provisions, there is a danger that an external attacker, who is attempting to open the door of the vehicle without being authorized to do so, may carry out a so-called "relay attack", as described below, using relatively little in the way of technical resources.

Figure 2A:
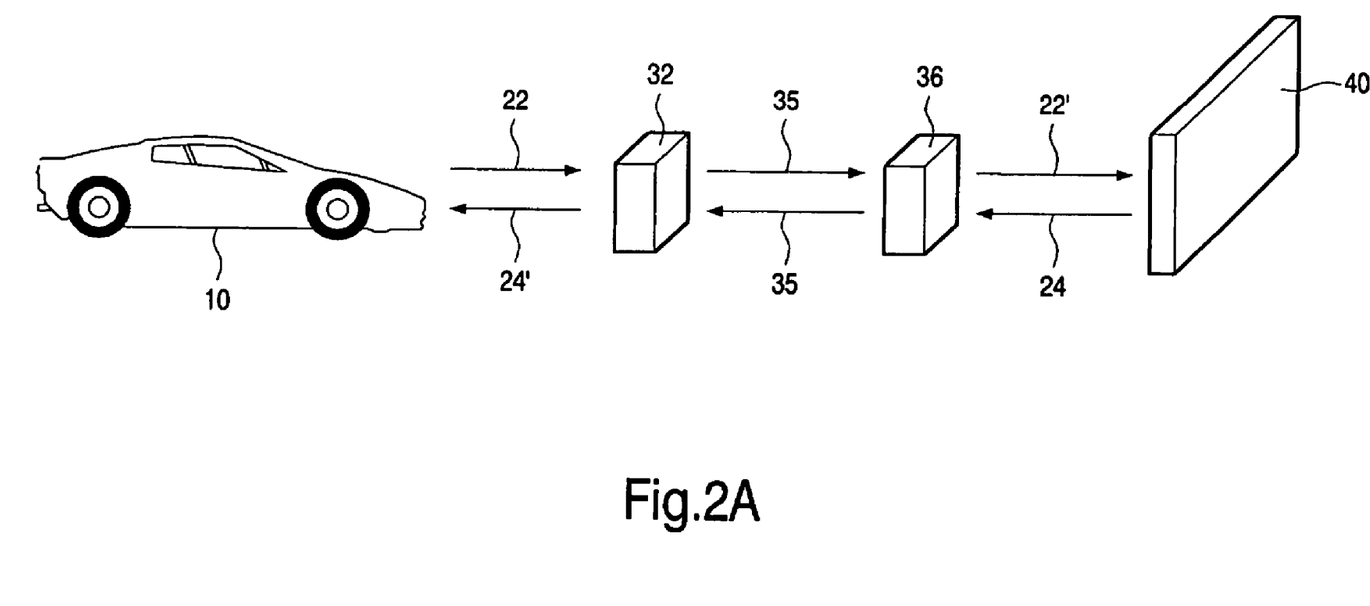
FIG. 2A is a schematic representation of a so-called "relay attack" on the prior art embodiment shown in FIGS. 1A and 1B.
Figure 2B:
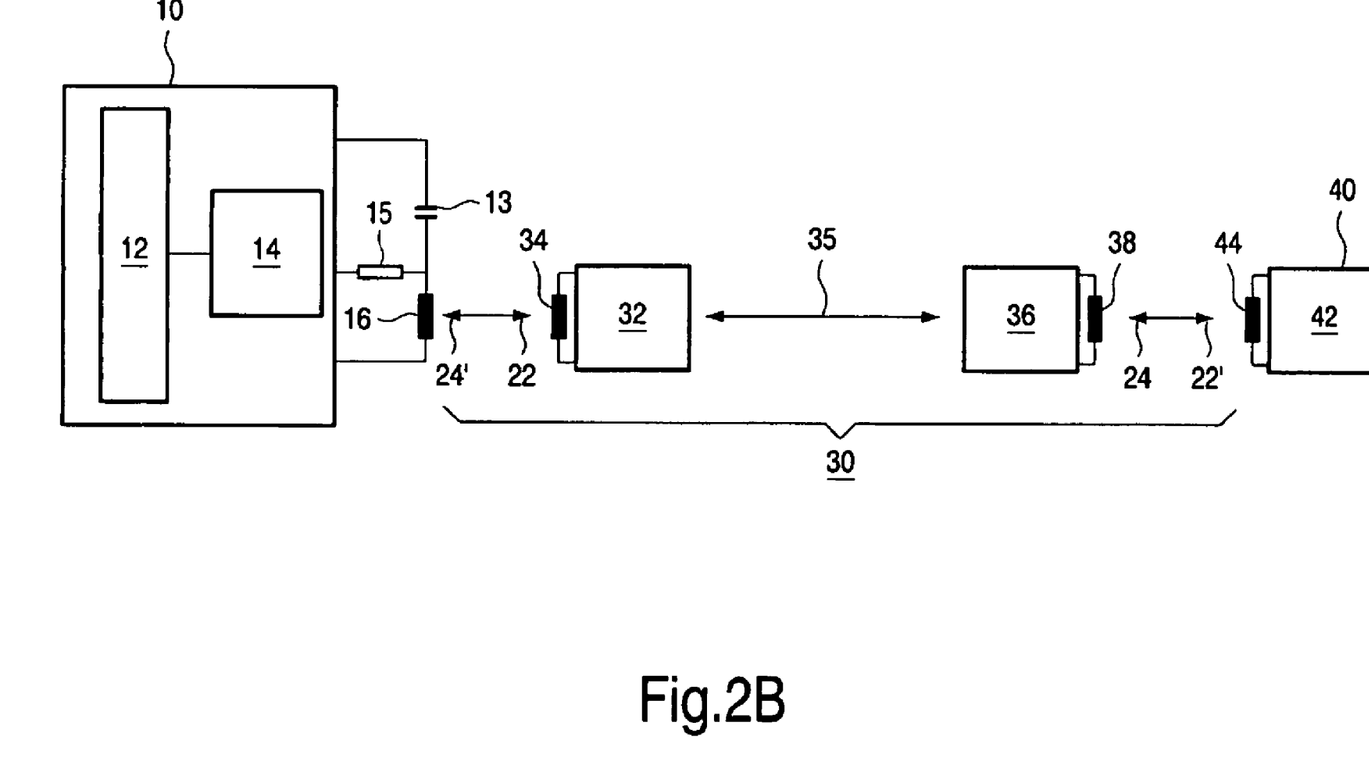
FIG. 2B is the equivalent electrical circuit diagram of the relay attack shown in FIG. 2A.

Shown diagrammatically in FIGS. 2A and 2B is an arrangement for carrying out a relay attack of this kind. For this purpose, there is introduced into the configuration shown in FIGS. 1A and 1B an "attacker kit" in the form of an additional transmission link 30 that comprises a first relay 32 in the form of an emulator for the transponder station, a second relay 36 in the form of an emulator for the base station, and a communications link 35 between the first relay 32 and the second relay 36.

In this connection, the communications link 35 between the first relay 32 and the second relay 36 may take the form of at least one bi-directional transmission channel of any desired type that allows there to be a random distance between the first relay 32 and the second relay 36.

To allow inductive coupling to the antenna unit 16 of the base station 10, the first relay 32 in the form of the transponder station emulator is fitted with an associated antenna unit 34 in the form of a coil; similarly, the second relay 36 in the form of the base station emulator is fitted with an associated antenna unit 38 in the form of a coil for inductive coupling to an antenna unit 44 in coil form of the transponder station 40.

One attacker then takes up position in the immediate vicinity of the motor vehicle with the first relay 32. A second attacker positions himself sufficiently close to the valid transponder station 40 with the second relay 36. Triggered by, for example, the operation of a door handle of the motor vehicle or of a pushbutton on a door of the motor vehicle, the base station 10 in the motor vehicle transmits its challenge to the first relay 32 by means of the original, i.e. unemulated, up-link frame 22.

From this first relay 32, the challenge is passed on via the above-mentioned communications link 35 to the second relay 36. The second relay 36 emulates the up-link 22 and in this way passes on the challenge to the valid transponder station 40 by means of the antenna unit 38 in coil form. Once the response has been calculated in the valid transponder station 40, this transponder station 40 responds to the second relay 36 by transmitting this response by means of the original, i.e. non-emulated down-link frame 24.

From this second relay 36, the response is passed on via the above-mentioned communications link 35 to the first relay 32. The first relay 32 emulates the down-link frame 24 and in this way passes on the response to the valid base station 10 in the motor vehicle by means of the antenna unit 34 in coil form.

Because the response was produced by the authentic transponder station 40 on the basis of the authentic challenge from the base station 10 using the correct crypto-algorithm and the correct key, the response is recognized as valid and the door of the motor vehicle opens, even though the authorized and rightful user does not want this.

In view of the fact that more stringent demands are being made nowadays on the operation and security of certain components, precisely in, for example, the area of automobiles and the area of access, the configuration shown in FIGS. 1A and 1B, which can be sabotaged by the measures shown in FIGS. 2A and 2B, appears not to be sufficiently secure.

Accordingly, certain proposals for detecting and guarding against relay attacks of this kind have already been made in the past. In printed publication EP 1 136 955 A2 for example, there is disclosed an arrangement for an access-safeguarding system (a P[assive] K[eyless]E[ntry] system) by means of which the relative orientation of the base station 10 and the transponder station 40 to one another can be calculated.

Under another proposal, to allow such relay attacks to be detected and guarded against, the time between the challenge and the response is determined to enable an additional delay due to the delays caused by the electronics of the relays and to the additional transit time of the signals between the relay stations to be detected in this way (the transit-time measurement method).

However, it is virtually impossible for a relay attack to be detected by the signal transit-time measurement method in a current transponder system having a carrier frequency of 125 kilohertz, because the stringent requirements for accuracy in the measurement of time can hardly be met in practice, the main reasons for which are tolerances in the filters used and temperature problems.

Figure 3:
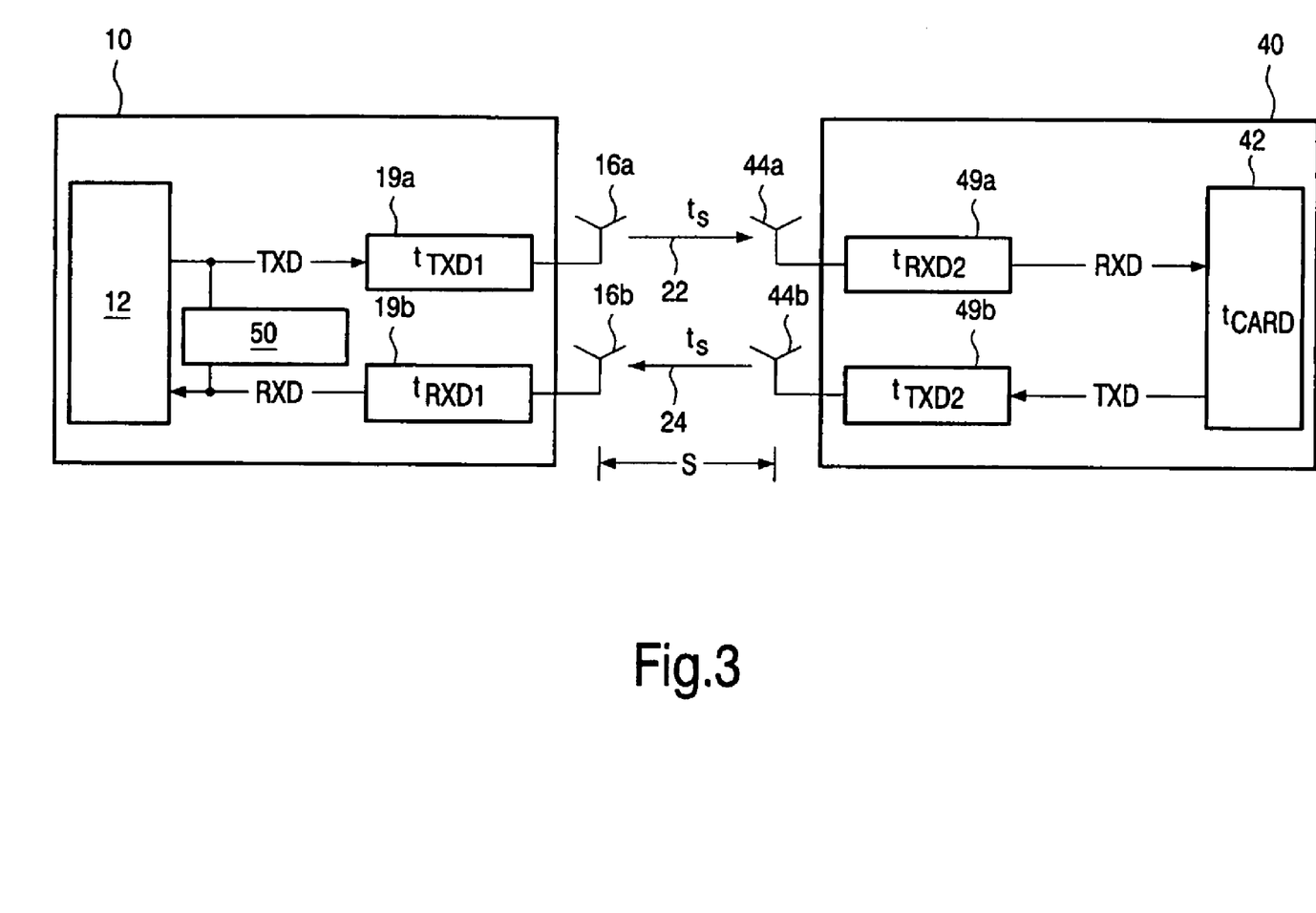
FIG. 3 is a schematic representation of the principle on which signal transit time is measured to allow the relay attack shown in FIGS. 2A and 2B to be detected, in the case of the prior art embodiment shown in FIGS. 1A and 1B.

So, to enable a relay attack to be safely and reliably detected by transit-time measurement, very stringent demands have to be made on the accuracy with which time is measured. Shown in FIG. 3 in schematic form is the principle of a measurement of signal transit-time of this kind, for detecting a relay attack as shown in FIGS. 2A and 2B, such as would be used in the case of the prior art embodiment shown in FIGS. 1A and 1B. The total signal transit-time works out as follows in this case:

$$t_{total} = t_{TXD1} + t_s + t_{RXD2} + t_{CARD} + t_{TXD2} + t_s + t_{RXD1}$$

A criterion for the occurrence of a relay attack is therefore that, due to the additional relay link, the distance s between the base station 10 and the transponder station 40 exceeds a given maximum permitted distance $s_{max}$. To allow a relay attack to be detected, this distance s, which can be calculated from the transit time $t_s$ of the signals 22, 24 and the known speed of propagation of the signals 22, 24 using the formula $s = v_s \cdot t_s$, has to be determined as accurately as possible.

However, it has to be remembered that in the case of a signal transit-time measurement as in FIG. 3, the additional delays $t_{TXD1}$, $t_{RXD2}$, $t_{CARD}$, $t_{TXD2}$ and $t_{RXD1}$ are added to the signal transit time $t_s$ that is wanted. For the distance s between the base station 10 and the transponder station 40 to be accurately determined, and hence too for a sufficiently short maximum permitted distance $s_{max}$ (with no great safety reserve) to be selected, these additional components of the signal transit time need to be known, or need to be determined with sufficient accuracy.

Another thing that needs to be borne in mind in this case is that in a practical system to be produced in large numbers at low cost, considerable tolerances $\Delta t_{TXD1}$, $\Delta t_{TXD2}$, $\Delta t_{RXD1}$ and $\Delta t_{RXD2}$ can be expected on the signal transit times due to the electronics of the base station 10 and/or of the transponder station 40. These tolerances are due to the effects of ageing, to scatter among the components used and to the effects of temperature. Unless additional steps are taken, these tolerances too have to be allowed for when determining the threshold value $s_{max}$.

On the basis of the disadvantages and deficiencies described above and with due acknowledgement of the prior art outlined, it is an object of the present invention to further develop an electronic communication system of the kind described at the beginning, and a method of detecting and/or guarding against at least one external attack, and preferably at least one relay attack, on at least one electronic communication system of the kind described at the beginning, in such a way that the attack is at least made considerably more difficult and if possible is completely guarded against and prevented.

This object is achieved by an electronic communication system having the features specified in claim 1 and by a method having the features specified in claim 7. Advantageous embodiments and useful refinements of the present invention are characterized in the respective sets of dependent claims.

Under the teaching of the present invention there is arranged in the base station at least one first adjustable delay element for setting a defined, and in particular substantially constant, signal transit time $t_1$ within the base station and/or there is arranged in the transponder station at least one second adjustable delay element for setting a defined, and in particular substantially constant, signal transit time $t_2$ within the transponder station.

An additional, adjustable signal propagation delay is thus introduced, in accordance with the invention, into the transmission chain.

By means of the first adjustable delay element and by means of the second adjustable delay element, the signal transit time $t_1$ within the base station and the signal transit time $t_2$ with the transponder station can be respectively set, which means that the attack is detected if the sum of the signal transit time $t_1$ within the base station, the signal transit time $t_2$ within the transponder station, and twice the signal transit time $t_s$ of the data signals between the base station and the transponder station exceeds a defined threshold value $t_{s,\ max}$.

Hence, the basic idea behind the present invention is to compensate for the signal transit times of the transmitting and receiving units of P[assive] K[eyless] E[ntry] systems, suitable technical steps being taken (=arrangement of at least one first adjustable delay element for setting a defined, and in particular substantially constant, signal transit time $t_1$ within the base station and/or arrangement of at least one second adjustable delay element for setting a defined, and in particular substantially constant, signal transit time $t_2$ within the transponder station) to ensure as constant as possible a signal propagation delay for the transmitting and receiving sub-assemblies both at the base station end, e.g. on or in the vehicle to be secured, and at the transponder end, on or in the PKE data carrier (the PKE card).

By suitable regulation and setting of the particular delays $t_{D1}$ and $t_{D2}$ within the base station and transponder station respectively by means of the respective additional delay elements, improved conditions are obtained for detecting and/or guarding against relay attacks, as shown by the following equations:

$$t_1 = t_{RXD1} + t_{D1} + t_{TXD1} = \text{substantially constant},$$

$$t_2 = t_{RXD2} + t_{D2} + t_{CARD} + t_{TXD2} = \text{substantially constant}.$$

A relay attack is therefore taking place if the following threshold value condition is met:

$$t_{s,max} < t_1 + t_2 + 2t_s = t_{RXD1} + t_{D1} + t_{TXD1} + t_{RXD2} + t_{D2} + t_{CARD} + t_{TXD2} + 2t_s.$$

In a practical implementation, a comparison may therefore advantageously be made with a fixed threshold $t_{s,max}$, once the latter has been defined, in which case allowance will advantageously have been made for the dependences of the signal transit times on the system tolerances $Dt_{TXD1}$, $Dt_{TXD2}$, $Dt_{RXD1}$ and $Dt_{RXD2}$.

In a particularly inventive refinement of the present electronic communication system and of the method of detecting a relay attack thereon, provision may be made for optional temperature measurement, by means of which it is possible, by using the additional delay elements, to produce ensuing compensation for the temperature dependence with the aim of obtaining total delays $t_1$ within the base station and $t_2$ with the transponder station which are each constant and, in particular, non-temperature-dependent.

The (regulating) algorithm for implementing the method according to the present invention may preferably be executed even during a communication between the base station and transponder station, to prevent an external attack on the regulating algorithm by detection of the attacking relays. In this case, the relays have to pass on the data if the protocol is not to be injured.

In an advantageous embodiment of the present invention, the regulating algorithm for producing the signal transit times t1 and t2 may be executed by any desired method, such as, for example, the counting method or the successive approximation method.

The delay element, which is preferably multistage and preferably switchable, may usefully comprise suitable components of any desired kinds such as, say,

- at least one digital gate subject to a known signal transit time and/or
- at least one filter and/or
- at least one clocked shift register.

The man skilled in the art of communications electronics, such as, for example, an electrical engineer having detailed knowledge in the field of security systems, will be particularly appreciative of the fact that the present invention assists in the production of a P[assive K[eyless]E[ntry] system that is highly resistant to external attack, i.e. by an exact measurement of time it makes so-called "relay attack" very much more difficult. In line with this, it becomes possible for an additional exact measurement of time for detecting a relay attack with increased reliability to be implemented in a manner suitable for practical application.

For the practical implementation of the measurement of time, a comparison of the total signal transit time measured may advantageously be made, with great accuracy, with a fixed threshold $t_{s,max}$ subject to tight tolerances, in which case inexpensive modes of implementation that are possible make the electronic communication system and the associated method highly attractive for use in mass production.

The present invention, which extends both to at least one base station of the kind described above and to at least one transponder station of the kind described above, may advantageously also be used in systems that are widely employed in the field of so-called "immobilizer" systems for means of transport and particularly motor vehicles.

Another area of application for the present invention is in the field of building security, because the electronic communication system, with its base station and also with its transponder station, is also superbly well suited to the production of secure access systems based on transponders, and particularly on data carriers such as, say, chip cards or P[assive K[eyless]E[ntry] cards.

Hence, the base station may be arranged on or in an object or building that is to be secured against unauthorized use and/or against unauthorized access, such as on or in a means of transport, say, or on or in an access system.

As has already been discussed above, there are various possible ways in which the teaching of the present invention may advantageously be embodied and refined. These and other aspects of the invention are apparent from and will be elucidated with reference to the embodiments described hereinafter.

In the drawings.

Arrangement, elements or features that are the same or similar in FIGS. 1A to 5 are given the same reference numerals.

Figure 4:
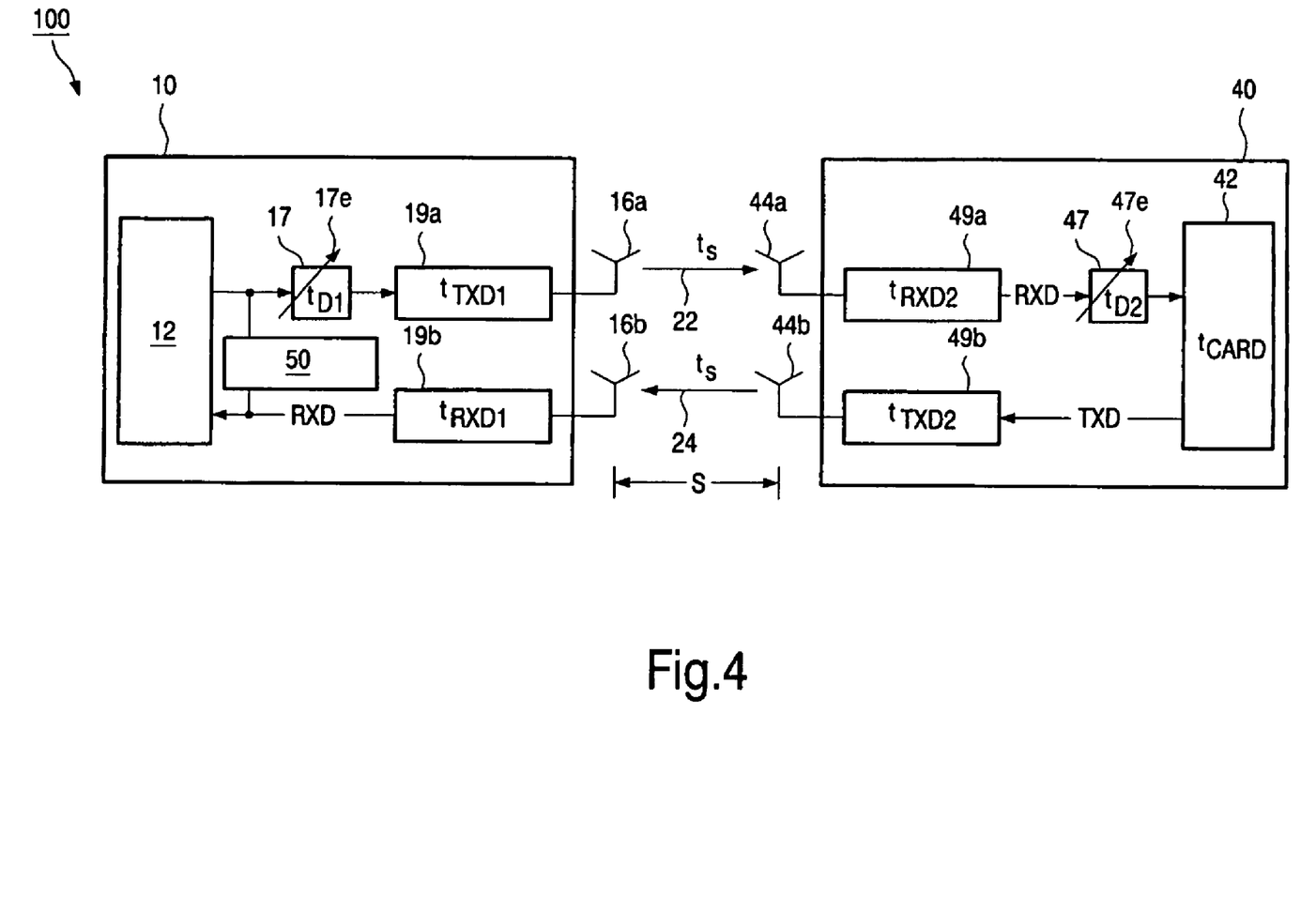
FIG. 4 is a schematic representation of the principle of measurement according to the present invention for detecting the relay attack shown in FIGS. 2A and 2B, which principle is based on the production of constant signal transit times, in an embodiment according to the present invention.

As is shown in FIG. 4 by an embodiment, what is implemented by means of the present invention is an electronic communication system 100 that has, amongst other things, a transponder system (=transponder station 40 in the form of a data carrier, namely a P[assive K[eyless]E[ntry] card), which in turn is part of a system for opening and closing the door locks of a motor vehicle.

The PKE card 40 has a receiver unit 49a having a signal transit time $t_{RXD2}$, the receiver unit 49a being connected to an antenna unit 44a and being used to receive data signals 22 from a base station 10. The PKE card 40 also has a transmitter unit 49b having a signal transit time $t_{TXD2}$, the transmitter unit 49b being connected to an antenna unit 44b and being used to transmit data signals 24 to the base station 10. Connected downstream of the receiver unit 49a and upstream of the transmitter unit 49b is a control unit 42 (→signal transit time $t_{CARD}$) in the form of a microcontroller unit that is provided to control the PKE card 40.

A base station 10 that is also shown in FIG. 4 has a receiver unit 19b having a signal transit time $t_{RXD1}$, the receiver unit 19b being connected to an antenna unit 16b and being used to receive data signals 24 from a PKE card 40. The base station 10 also has a transmitter unit 19a having a signal transit time $t_{TXD1}$, the transmitter unit 19a being connected to an antenna unit 16a and being used to transmit the above-mentioned data signals 22 to the PKE card 40. Connected downstream of the receiver unit 19b and upstream of the transmitter unit 19a is a control unit 12 in the form of a microcontroller unit that is provided to control the base station 10.

When the PKE card 40 is in the active state (see FIG. 4), a communication sequence intended for authentication purposes takes place in the form of an exchange of data between the base station 10 and the PKE card 40, for which purpose data signals 22, 24 are exchanged between the base station 10 and the transponder station 40; by means of these data signals 22, 24, not only can authorization to use and/or access the motor vehicle be determined but the base station 10 can also be controlled in the appropriate way. In the case of P[assive K[eyless]E[ntry] which is being described here, the power supply may preferably be supplied by at least one battery unit.

In detail, what exist as signal transmission links between the base station 10 and the PKE card 40 are a so-called "up-link frame" 22 that is formed by, for example, at least one inductively coupled L[ow]F[requency] channel and via which signals are transmitted from the base station 10 to the PKE card 40, and a so-called "down-link frame" 24 that is formed by, for example, at least one U[ltra]H[igh]F[requency] channel and via which signals are transmitted from the PKE card 40 to the base station 10.

Figure 5:
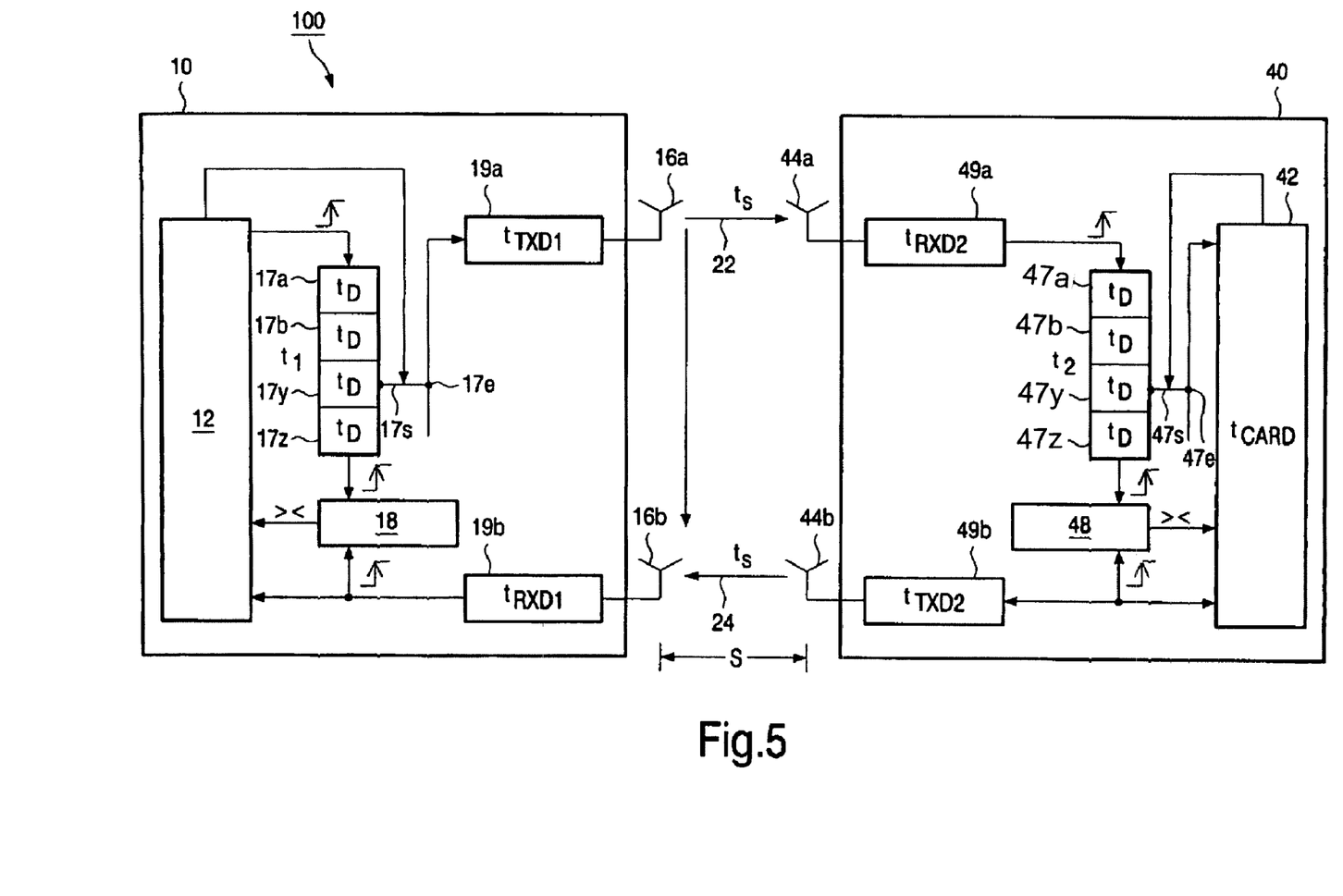
FIG. 5 is a schematic representation of the measures according to the present invention for regulating the delay to signal propagation within the base station and/or within the transponder station to constant signal transit time values as in FIG. 4.

However, it is also within the scope of the present invention for both the up-link frame 22 and the down-link frame 24 each to be formed by at least one L[ow]F[requency] channel in the embodiment shown in FIGS. 4 and 5. As an alternative to this, it is in turn also possible for both the up-link frame 22 and the down-link frame 24 each to be formed by at least one U[ltra]H[igh]F[requency] channel.

Once the door lock, for example, of the motor vehicle has been operated, the base station 10 that is functionally and spatially associated with the motor vehicle begins to generate a signal referred to as a "challenge", which is transmitted to the PKE card 40 via the up-link frame 22. An electronic circuit arrangement in the PKE card 40 that is preferably arranged to have at least one microprocessor then calculates from the challenge, using a cryptographic algorithm and a secret key, a signal sequence that is referred to as a "response". This response signal is then transmitted from the PKE card 40 via the down-link frame 24 to the base station 10.

The base station 10 then compares the response, using an identical crypto-algorithm and an identical secret key; if identity is found, the base station 10 then causes the motor vehicle's door lock to be opened, or in other words, only if the authentication recognizes the PKE card 40 as valid, generally by the use of cryptographic methods, is the door lock of the motor vehicle opened in the embodiment cited.

In order now to provide resistance to relay attacks of the kind described by reference to FIGS. 2A and 2B, there is arranged in the base station 10 a first delay element 17 that is connected downstream of the control unit 12 and upstream of the transmitter unit 19a and that is used to set a defined, substantially constant, signal transit time $t_1$ within the base station 10. Similarly, there is arranged in the PKE card 40 a second delay element 47 that is connected downstream of the receiver unit 49a and upstream of the control unit 42 and that is used to set a defined, substantially constant, signal transit time $t_2$ within the PKE card 40.

An external relay attack is now detected if the sum of
the signal transit time $t_1$ within the base station 10,
the signal transit time $t_2$ within the PKE card 40, and
twice ($\leftrightarrows$ "out" signal 22 and "back" signal 24) the signal transit time $t_s$ between the base station 10 and the PKE card 40 exceeds a defined threshold value $t_{s,max}$, that is to say if the threshold value condition $t_{s,max} < t_1 + t_2 + 2t_s$ or $t_{s,max} < t_{RXD1} + t_{D1} + t_{TXD1} + t_{RXD2} + t_{D2} + t_{CARD} + 2t_s$ is met, where
the signal transit time $t_1$ within the base station 10 is composed, in essence, of
the signal transit time $t_{RXD1}$ within the receiver unit 19b
the delay in signal transit time $t_{D1}$ caused by the first delay element 17, and
the signal transit time $t_{TXD1}$ within the transmitter unit 19a and
the signal transit time $t_2$ within the PKE card 40 is composed, in essence, of
the signal transit time $t_{RXD2}$ within the receiver unit 49a
the delay in signal transit time $t_{D1}$ caused by the second delay element 47
the signal transit time $t_{CARD}$ with the control unit 42, and
the signal transit time $t_{TXD2}$ within the transmitter unit 49a
and $t_s$ is once the signal transit between the base station 10 and the PKE card 40 and $2t_s$ is therefore twice this signal transit time.

To then enable this basic idea of the present invention to be implemented, namely the use of a constant signal propagation delay $t_1$ ($\rightarrow$base station 10) or $t_2$ ($\rightarrow$PKE card 40), that is defined once, for the electronic sub-assemblies for transmitting and receiving the data exchanged between the motor vehicle ($\rightarrow$base station 10) and the P[assive] K[eyless]E[ntry] card 40, both the first delay element 17 within the base station 10 and the second delay element 47 within the PKE card 40 (see reference numerals 17e and 47e respectively) are arranged to be adjustable in four stages (see reference numerals 17a, 17b, 17y, 17z and 47a, 47b, 47y, 47z respectively) and switchable (see reference numerals 17s and 47s respectively), in the form of, for example
at least one digital gate subject to a known signal transit time and/or
at least one filter and/or
at least one clocked shift register.

To regulate the delay times $t_1$ and $t_2$ applicable to signal propagation to constant values, there are various technical implementations that are obvious possibilities. In what follows, a simple and inexpensive implementation employing regulation of the transit time will be described by reference to the detailed representation in FIG. 5, first by taking the base station 10 as an example:

A pulse to be transmitted from the base station 10 to the PKE card 40 is conveyed to the multistage (see reference numerals 17a, 17b, 17y) and switchable (see reference numeral 17s) first delay element 17. The delayed pulse is then fed to the transmitter (=transmitter unit 19a of the base station 10) and is received directly, i.e. with no relevant additional delay in signal propagation, by the receiver (=receiver unit 19b of the base station 10). At the same time, the pulse is also fed through the entire delay line, i.e. through all four stages 17a, 17b, 17y, 17z of the first delay element 17 ($\rightarrow$delay time $t_1$).

A decision-maker (=first decision-making unit 18 of the base station 10) that is connected downstream of the fourth and last stage 17z of the delay element 17 and that is connected to the receiver unit 19b signals to the control unit 12 which of the two pulses ("delayed pulse" or "pulse fed through the entire delay line") arrives at the first decision-making unit 18 first.

In conjunction with a regulating algorithm that is implemented in the control unit 12, the switchable delay element 17 is set or corrected in such a way that the two pulses arrive as near simultaneously as possible; in this event, where the delayed pulse and the pulse that has been fed through the entire delay line arrive substantially simultaneously, the desired constant total delay $t_1$ in signal propagation is produced.

In what follows, an implementation employing regulation of the transit time will be described, also by reference to the detailed representation in FIG. 5, by taking the PKE card 40 as an example, which will show that the method described above for easily and inexpensively regulating signal transit times can be used in a similar or analogous fashion for compensating for the signal transit times in the PKE card 40.

A pulse transmitted from the base station 10 to the PKE card 40 is conveyed to the multistage (see reference numerals 47a, 47b, 47y) and switchable (see reference numeral 47s) second delay element 47. At the same time, the pulse is also fed through the entire delay line, i.e. through all four stages 47a, 47b, 47y, 47z of the second delay element 47 (→delay time $t_2$).

A decision-maker (=second decision-making unit 48 of the PKE card 40) that is connected downstream of the fourth and last stage 47z of the delay element 47 and that is connected to the transmitter unit 49b signals to the control unit 42 which of the two pulses ("delayed pulse" or "pulse fed through the entire delay line") arrives at the second decision-making unit 48 first.

In conjunction with a regulating algorithm that is implemented in the control unit 42, the switchable delay element 47 is set or corrected in such a way that the two pulses arrive as near simultaneously as possible; in this event, where the delayed pulse and the pulse that has been fed through the entire delay line arrive substantially simultaneously, the desired constant total delay $t_2$ in signal propagation is produced.

So, what can be said as a result is that compensation for the tolerances on the signal transit times of transmitter and receiver units is obtained by means of the electronic communication system 100 shown in FIGS. 4 and 5 and by means of the method associated with this communication system 100, which compensation may advantageously be employed in P[assive] K[eyless]E[ntry] systems or in similar configurations. In such systems, the present invention implements a form of transit time measurement by means of which a potential external attack in the form of a so-called relay attack can be detected and/or guarded against.

In this case, both the electronic communication system 100 described and the method described constitute a flexible, cost-efficient, novel and inventive extension of signal transit time measurements which were possible in the prior art, to enable these latter to be used even under practical conditions. The accuracy and reliability of the principle of time measurement (see the time measuring unit 50 in FIG. 4) are increased in this case.

In this connection, typical incidental conditions that made it difficult for signal transit time measurement to be used in the past are overcome in accordance with the invention, such as, say scatters in the signal transit times within the transmitter and receiver due to tolerances on the components changes in the signal transit times within the transmitter and receiver due to the effects of temperature and to ageing, and/or the pressure of costs when used in mass production.

The present invention may with advantage be used in P[assive K[eyless]E[ntry] systems, which are being used to an increasing degree in the field of access systems for motor vehicles. What is more, the electronic communication system 100 described and the method described are also suitable for producing secure access systems based on chip cards 40 in the field of building security, in which case the arrangement described that is shown in FIGS. 4 and 5 may also be used in a similar way to guard against relay attacks on access/entry systems.

LIST OF REFERENCE NUMERALS

100 Electronic communication system
10 Base station
11 First resistor of base station 10
12 Control unit, in particular microcontroller unit, of base station 10
13 Capacitive unit of base station 10
14 Analog interface of base station 10
15 Second resistor of base station 10
16 Antenna unit of base station 10
16a Antenna unit of base station 10 associated with transmitter unit 19a
16b Antenna unit of base station 10 associated with receiver unit 19b
17 First delay element of base station 10
17a First stage of first delay element 17
17b Second stage of first delay element 17
17e Setting facility of first delay element 17
17s Switching facility of first delay element 17
17y Stage before last of first delay element 17
17z Last stage of first delay element 17
18 First decision-making unit of base station 10
19a Transmitter unit of base station 10
19b Receiver unit of base station 10
22 Up-link frame
23 Up-link frame emulation
24 Down-link frame
25 Down-link frame emulation
30 Additional transmission link
32 First relay forming an emulator for the transponder station 40
34 Antenna unit of first relay 32
35 Communications link between first relay 32 and second relay 36
36 Second relay forming an emulator for the base station 10
38 Antenna unit of second relay 36
40 Transponder station, in particular a data carrier and specifically a P[assive K[eyless]E[ntry] card
42 Circuit arrangement or control unit, in particular microcontroller unit, of transponder station 40
44 Antenna unit of transponder station 40
44a Antenna unit of transponder station 40 associated with receiver unit 49a
44b Antenna unit of transponder station 40 associated with transmitter unit 49b
47 Second delay element of transponder station 40
47a First stage of second delay element 47
47b Second stage of second delay element 47
47e Setting facility of second delay element 47
47s Switching facility of second delay element 47
47y Stage before last of second delay element 47
47z Last stage of second delay element 47
48 Second decision-making unit of transponder station 40
49a Receiver unit of base station 40
49b Transmitter unit of base station 40
50 Time measurement facility
s Distance between base station 10 and transponder station 40
$t_1$ Signal transit time within base station 10
$t_2$ Signal transit time with transponder station 40
$t_{CARD}$ Signal transit time in control unit 42 of transponder station 40
$t_{D1}$ Delay in transit time within first delay element 17 of base station 10
$t_{D2}$ Delay in transit time within second delay element 47 of transponder station 40

$t_{RXD1}$ Signal transit time in receiver unit 19b of base station 10
$\Delta t_{RXD1}$ Tolerance on signal transit time in receiver unit 19b of base station 10
$t_{RXD2}$ Signal transit time in receiver unit 49a of transponder station 40
$\Delta t_{RXD2}$ Tolerance on signal transit time in receiver unit 49a of transponder station 40
$t_s$ Signal transit time between base station 10 and transponder station 40
$t_{total}$ Total signal transit time in the electronic communication system 100
$t_{TXD1}$ Signal transit time in transmitter unit 19a of base station 10
$\Delta t_{TXD1}$ Tolerance on signal transit time in transmitter unit 19a of base station 10
$t_{TXD2}$ Signal transit time in transmitter unit 49b of transponder station 40
$\Delta t_{TXD2}$ Tolerance on signal transit time in transmitter unit 49b of transponder station 40
$V_s$ Speed of signal propagation between base station 10 and transponder station 40

The invention claimed is:

1. An electronic communication system, having
at least one base station having at least one antenna unit, in particular in coil form, which base station is arranged in particular on or in an object to be secured against unauthorized use and/or against unauthorized access on or in a means of transport or on or in an access system, and
at least one transponder station, in particular in data-carrier form, having at least one antenna unit, in particular in coil form, which transponder station
may in particular be carried with him by an authorized user and/or
is designed to exchange data signals with the base station, in which case, by means of the data signals
the authorization for use and/or access can be determined and/or
the base station can be controlled accordingly, characterized in that
there is arranged in the base station at least one first delay element for setting a defined, and in particular substantially constant, signal transit time within the base station, wherein the first delay element comprises a first multistage element with a first plurality of individual delay stages and/or
there is arranged in the transponder station at least one second delay element for setting a defined, and in particular substantially constant, signal transit time within the transponder station, wherein the second delay element comprises a second multistage element with a second plurality of individual delay stages.

2. A communication system as claimed in claim 1, characterized in that the first delay element and/or the second delay element are/is arranged to be settable and switchable and have/has
at least one digital gate subject to a known signal transit time and/or
at least one filter and/or
at least one clocked shift register.

3. A communication system as claimed in claim 1, characterized in that
there is connected downstream of the last stage of the first delay element at least one first decision-making unit that is connected to at least one control unit of the base station and/or to at least one receiver unit of the base station and/or there is connected downstream of the last stage of the second delay element at least one second decision-making unit that is connected to at least one control unit of the transponder station and/or to at least one receiver unit of the transponder station.

4. A base station for an electronic communication system as claimed in claim 1, characterized by
at least one receiver unit for receiving the data signals from the transponder station, which receiver unit is connected to the antenna unit associated with the base station,
at least one control unit, in particular a microcontroller unit, for controlling the base station, which control unit is connected to the receiver unit and is preferably connected upstream of the first delay element,
the at least one first delay element for setting the defined, and in particular substantially constant, signal transit time within the base station, and
at least one transmitter unit for transmitting the data signals to the transponder station, which transmitter unit is connected to the antenna unit associated with the base station and is preferably connected downstream of the first delay element.

5. A transponder station for an electronic communication system as claimed in claim 1 characterized by
at least one receiver unit for receiving the data signals from the base station, which receiver unit is connected to the antenna unit associated with the transponder station and is preferably connected upstream of the second delay element,
the at least one second delay element for setting the defined, and in particular substantially constant, signal transit time within the transponder station,
at least one control unit, in particular a microcontroller unit, for controlling the transponder station, which control unit is preferably connected downstream of the second delay element, and
at least one transmitter unit for transmitting the data signals to the base station, which transmitter unit is connected to the antenna unit associated with the transponder station and is preferably connected downstream of the control unit.

6. A transponder station as claimed in claim 5, characterized in that the transponder station is arranged in at least one chip card.

7. A method of detecting and/or guarding against at least one, in particular external, attack, and preferably at least one relay attack, on at least one electronic communication system as defined in the preamble to claim 1, characterized in that there are/is set
within the base station, a defined, and in particular substantially constant, signal transit time and/or within the transponder station, a defined, and in particular substantially constant, signal transit time, thus enabling the attack to be detected if the sum of
the signal transit time within the base station,
the signal transit time within the transponder station and
twice the signal transit time of the data signals between the base station and the transponder station exceeds a defined threshold value.

8. A method as claimed in claim 7, characterized in that
a pulse that forms at least part of the data signal to be transmitted to the transponder station is conveyed within the base station to at least one stage of the first delay element,
the pulse, having been delayed by the at least one stage of the first delay element, is then fed to at least one transmitter unit associated with the base station and is received directly, with no relevant additional delay, by at least one receiver unit associated with the base station, the pulse that forms at least part of the data signal to be transmitted to the transponder station is fed through the entire first delay element substantially at the same time, at least one first decision-making unit that is connected downstream of the last stage of the first delay element signals to at least one control unit of the base station to determine whether it is the delayed pulse fed through the transmitter unit and the receiver unit of the base station or the pulse fed through the entire first delay element that arrives at the first decision-making unit first, and the first delay element is so set or switched or corrected that the delayed pulse fed through the transmitter unit and the receiver unit of the base station and the pulse fed through the entire first delay element arrive as nearly simultaneously as possible.

9. A method as claimed in claim 7, characterized in that a pulse that forms at least part of the data signal received from the base station is conveyed within the transponder station to at least one stage of the second delay element, the pulse, having been delayed by the at least one stage of the second delay element, is then fed to a microcontroller unit of the transponder station, the pulse that forms at least part of the data signal received from the base station is also fed through the entire second delay element substantially at the same time, at least one second decision-making unit that is connected downstream of the last stage of the second delay element signals to at least one control unit of the transponder station to determine whether it is the delayed pulse fed through the microcontroller unit of the transponder station or the pulse fed through the entire second delay element that arrives at the second decision-making unit first, and the second delay element is so set or switched or corrected that the delayed pulse fed through the microcontroller unit of the transponder station and the pulse fed through the entire second delay element arrive as nearly simultaneously as possible.

10. The electronic communication system of claim 5, further comprising use of the electronic communication system and the transponder station for authenticating and/or for identifying and/or for checking the authority to use or enter an object to be secured by means of the communication system.

11. The electronic communication system of claim 10, wherein the object to be secured comprises a means of transport.

12. The electronic communication system of claim 10, wherein the electronic communication system comprises an access system for a building.

* * * * *